UNITED STATES PATENT OFFICE.

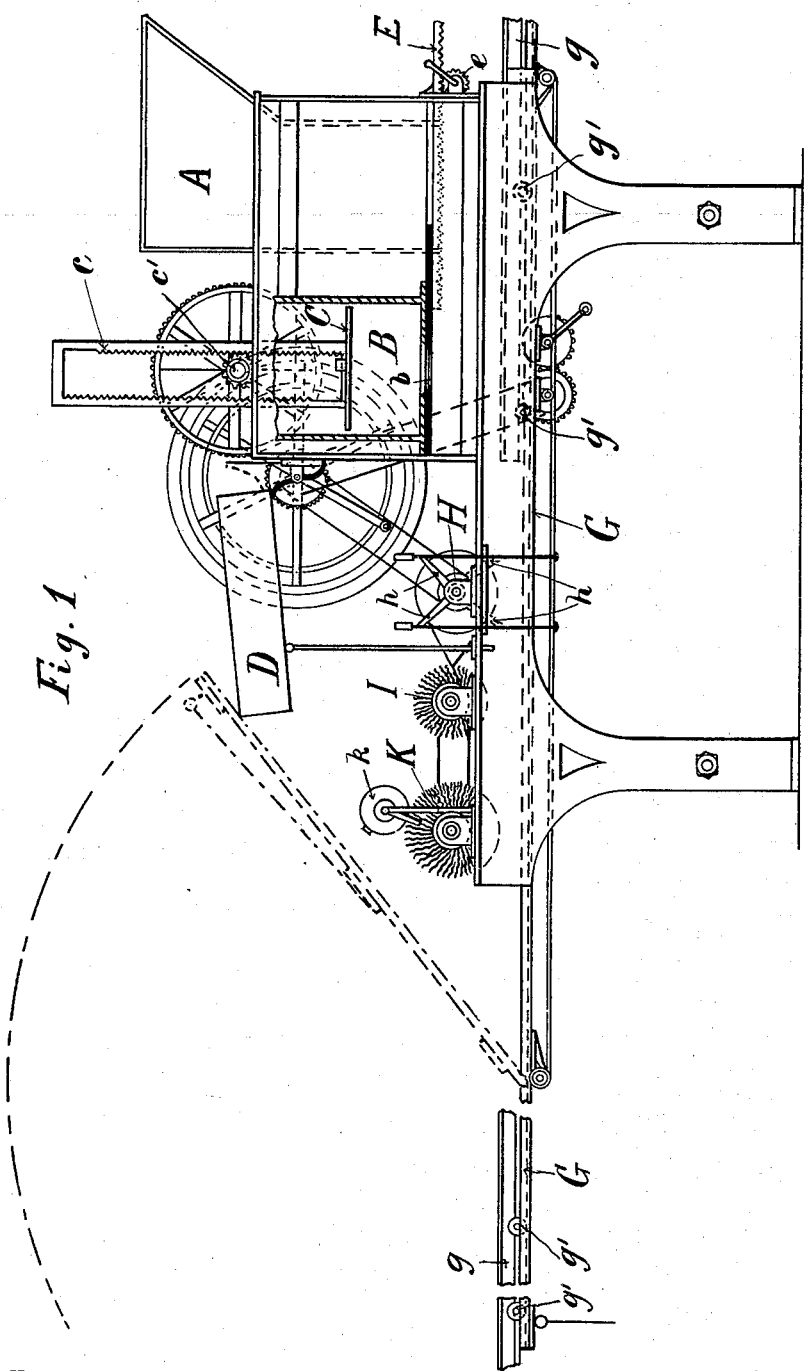

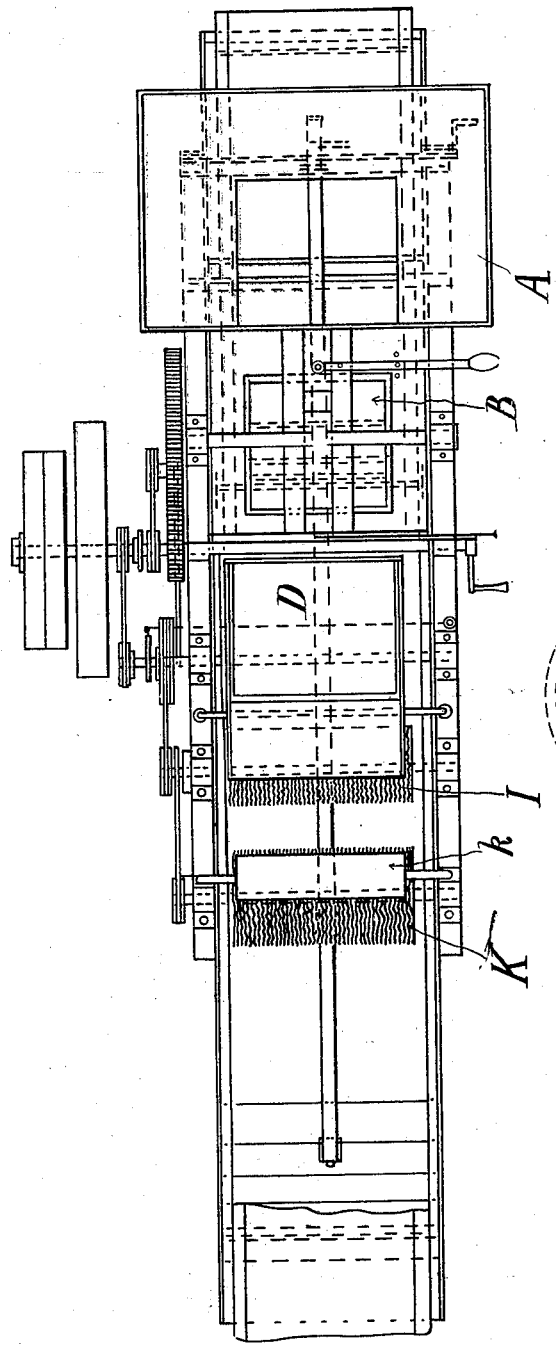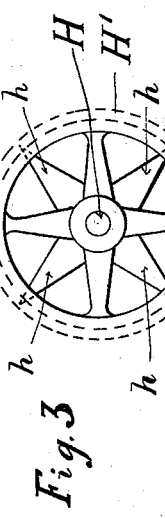

WILLIAM WATSON, OF LONDON, ENGLAND.

BREAD-MAKING MACHINE.

SPECIFICATION forming part of Letters Patent No. 628,568, dated July 11, 1899.

Application filed February 17, 1898. Serial No. 670,698. (No model.)

*To all whom it may concern:*

Be it known that I, WILLIAM WATSON, a subject of the Queen of Great Britain and Ireland, and a resident of 3 Melcombe Place, Dorset Square, London, in the county of Middlesex, England, have invented a certain new and useful Bread-Making Machine, (for which I have obtained a patent in Great Britain, No. 507, bearing date January 7, 1898,) of which the following is a specification.

This invention relates to bread-making machinery; and it consists of improved devices for forming dough into loaves and conveying it into an oven.

The bottom or floor of the oven on which the bread is baked consists of one or more iron or other plates which can be caused to slide freely in and out of the oven, running upon rollers or guide-pulleys and being moved by chains or racks adapted to the purpose. Outside the mouth of the oven and in proximity thereto the remainder of the apparatus is placed when in operation. It consists of a strong vertical chamber or other box which serves as a casing in which a ram or piston is capable of sliding up and down, its movement being produced, preferably, by means of a double rack or racks which gear with a pinion or pinions fixed to and revoluble upon a spindle running in bearings above the box. The piston may also be worked by a screw. An opening or openings in the top or one side of the casing serves to permit of the dough being introduced into the box either by sliding the box from under the piston or raising the piston above it. One or more openings in its bottom allows the dough to pass out in the form of strips or rolls when forced by the pressure of the ram or piston upon it. These strips or rolls of dough are preferably of such a size as to form loaves when divided into lengths of such size as may be required, and they issue from the box at the same speed as the oven-bottom or part of same moves forward. They then pass under a "dust-box," which covers their upper surfaces with flour, thus preventing the blades of a rotating or reciprocating "divider" from adhering to them. The dividers are so arranged and adjusted that as the strips or rolls of dough pass underneath them it divides them wholly or partially through, so as to form them into loaves. These then pass under a circular or other dry brush, which brushes off the flour, and then under a wet or "wash" brush and are then led into the oven.

In order that my invention may be more fully understood and ascertained, I append drawings, in which—

Figure 1 shows a side elevation of my improved apparatus. Fig. 2 is a plan of same. Fig. 3 shows a modified arrangement for operating the dividers.

A indicates a hopper in which the dough is placed.

B indicates the vertical chamber, which can occupy either the position shown in the drawings or be slid underneath the hopper A, as shown in dotted lines.

C is the ram or piston, and $c$ the double rack, by means of which this piston can be moved up and down, the teeth engaging with a pinion $c'$, which is mounted upon the main spindle.

The bottom of the vertical chamber B is formed with openings $b$, through which the dough passes out in the form of strips or rolls of such a size that when divided into lengths they form loaves of any desired weight. The bottom of the chamber may have a square opening in the middle and a movable bottom sliding on bearers underneath it, in which are fixed the changeable slips or plates containing the openings through which the dough is pressed, thus securing any required size and shape of strips or rolls. This sliding bottom if moved by the rack E and pinion $e$ serves also to cut off the strips or rolls of dough and close up the bottom at any part of the downward movement of the piston.

G is the oven-bottom, consisting of one or more iron or other plates $g$, which are free to slide on rollers $g'$ either into the oven or out until they occupy a position underneath the chamber B, and the mechanism for moving the piston C and oven-bottom G, being connected together by any convenient driving-gear, are so timed that the strips of dough issue through the openings $b$ at the same speed as the oven-bottom passes underneath. Consequently they are deposited upon it and carried forward with it in the shape of a number of parallel strips or rolls.

At a point near the chamber B and between it and the oven-mouth is arranged a dust-box D, of any convenient description, which deposits a light sprinkling of flour upon the strips or rolls as they pass underneath it for the purpose of preventing their adhering to the blades of the divider H, which is situate immediately adjacent thereto. This divider H may be either reciprocating or rotary and is used for dividing the strips or rolls into lengths which form loaves. It is here shown as rotary and consists of any suitable number of blades $h$, which, being connected in any convenient manner to the other gearing, move at a corresponding speed thereto, which secures the loaves being of equal length. Thus the dividing-blades $h$ are easily removable and (in case of four being used) when one-pound loaves are required then the four blades are used. When two-pound loaves are required, two blades only are used, and when four-pound loaves are wanted then one blade only is used, the others being removed. The strips of dough are then carried onward toward the mouth of the oven and next pass under a rotary circular brush I, which brushes off the flour deposited by the dust-box. They may then be caused to pass under a rotary circular or other shaped wet or wash brush K, which when used secures the glazing generally seen upon the top of loaves. This brush K is preferably cylindrical and revolves on a central pin. It is supplied with the "wash" from a cylindrical tank $k$, placed above it, part of the surface of which is perforated with small holes, through which the wash percolates onto the brush when turned down for operation, but which perforated part is turned upward when it is required to stop the flow of the wash. The loaves are then carried still farther forward into the oven, and when the whole of the oven-bottom, with its load of loaves, has entered therein the batch is baked in the usual manner.

The different wheels and other mechanisms are shown in the drawings as being connected by chains or belts and toothed gearing, but they may be connected in any convenient manner and by any commonly-known forms of gearing. Thus the ram or piston may be operated by a screw and the divider H by a toothed rack L and wheel H', as shown in Fig. 3. The rack being fixed to the oven-bottom and gearing directly with the wheel upon the spindle of the divider secures positively-synchronous movements of the oven-bed and the divider-blades. It will be seen that by commencing this operation when the plate or plates forming the bottom or baking-floor of the oven are withdrawn therefrom and continuing it until the bottom or baking-floor is thrust entirely into the oven a whole batch of loaves may be shaped and fed into the oven without being in any way handled.

Having now described my invention, what I claim as new, and desire to secure by Letters Patent, is—

1. In bread-making machinery, the combination of the sliding oven floor or bottom plates $g$, the chamber B, having a perforated bottom $b$, the piston or ram C, operated by a rack $c$ and pinion $c'$, the dust-box D, the divider H, the rotating brush I, a frame for carrying the whole, and belt or other gearing for moving the different parts, substantially as described and shown.

2. In bread-making machinery, the combination of the sliding oven floor or bottom plates $g$, the chamber B having a perforated bottom $b$, the piston or ram C operated by a rack $c$ and pinion $c'$, the divider H, and the wash-brush K supplied by a receptacle $k$, a frame for carrying the whole, and belt or other gearing for moving the different parts, substantially as described and shown.

3. In bread-making machinery, the combination of the sliding oven floor or bottom plates $g$, the chamber B having a perforated bottom $b$, the piston or ram C operated by a rack $c$ and pinion $c'$, the dust-box D, the divider H, the rotating brush I, the wash-brush K, supplied by a receptacle $k$, a frame for carrying the whole, and belt or other gearing for moving the different parts, substantially as described and shown.

In witness whereof I have hereunto set my hand in presence of two witnesses.

WILLIAM WATSON.

Witnesses:
WILLIAM J. MUNDEN,
S. CLARK.